(12) United States Patent
Rumberg et al.

(10) Patent No.: US 10,090,005 B2
(45) Date of Patent: Oct. 2, 2018

(54) ANALOG VOICE ACTIVITY DETECTION

(71) Applicants: Brandon David Rumberg, Morgantown, WV (US); David W. Graham, Morgantown, WV (US)

(72) Inventors: Brandon David Rumberg, Morgantown, WV (US); David W. Graham, Morgantown, WV (US)

(73) Assignee: ASPINITY, INC., Morgantown, WV (US)

( * ) Notice: Subject to any disclaimer, the term of this patent is extended or adjusted under 35 U.S.C. 154(b) by 0 days.

(21) Appl. No.: 15/455,328

(22) Filed: Mar. 10, 2017

(65) Prior Publication Data

US 2017/0263268 A1 Sep. 14, 2017

Related U.S. Application Data

(60) Provisional application No. 62/306,167, filed on Mar. 10, 2016.

(51) Int. Cl.
| | |
|---|---|
| *G10L 15/02* | (2006.01) |
| *G10L 25/21* | (2013.01) |
| *G10L 25/18* | (2013.01) |
| *G10L 25/81* | (2013.01) |
| *G10L 25/84* | (2013.01) |
| *G10L 15/14* | (2006.01) |
| *G10L 21/038* | (2013.01) |
| *G10L 15/08* | (2006.01) |
| *G10L 25/78* | (2013.01) |

(52) U.S. Cl.
CPC ............... *G10L 25/84* (2013.01); *G10L 15/02* (2013.01); *G10L 15/142* (2013.01); *G10L 21/038* (2013.01); *G10L 25/18* (2013.01); *G10L 25/21* (2013.01); *G10L 25/78* (2013.01); *G10L 25/81* (2013.01); *G10L 2015/088* (2013.01); *G10L 2025/783* (2013.01); *G10L 2025/786* (2013.01)

(58) Field of Classification Search
CPC ............... G10L 25/78; G10L 2025/783; G10L 2025/786; G10L 25/81; G10L 25/84; G10L 25/87
See application file for complete search history.

(56) References Cited

U.S. PATENT DOCUMENTS

| | | | | |
|---|---|---|---|---|
| 4,696,041 A | * | 9/1987 | Sakata | ........... G10L 25/87 704/233 |
| 5,278,944 A | * | 1/1994 | Sasaki | ........... G10L 19/02 704/211 |
| 5,430,826 A | * | 7/1995 | Webster | ........... G10L 25/78 704/200 |

(Continued)

*Primary Examiner* — Eric Yen
(74) *Attorney, Agent, or Firm* — Buckley, Maschoff & Talwalkar LLC

(57) ABSTRACT

According to some embodiments, an analog processing portion may receive an audio signal from a microphone. The analog processing portion may then convert the audio signal into sub-band signals and estimate an energy statistic value, such as a Signal-to-Noise Ratio ("SNR") value, for each sub-band signal. A classification element may classify the estimated energy statistic values with analog processing such that a wakeup signal is generated when voice activity is detected. The wakeup signal may be associated with, for example, a battery-powered, always-listening audio application.

9 Claims, 23 Drawing Sheets

(56) References Cited

U.S. PATENT DOCUMENTS

| | | | | |
|---|---|---|---|---|
| 5,632,005 A * | 5/1997 | Davis | G10L 19/008 | 381/22 |
| 5,687,191 A * | 11/1997 | Lee | G10L 19/018 | 375/146 |
| 6,453,285 B1 * | 9/2002 | Anderson | G10L 25/78 | 381/94.3 |
| 7,881,927 B1 * | 2/2011 | Reuss | G10L 25/78 | 704/226 |
| 8,326,620 B2 * | 12/2012 | Hetherington | G10L 25/84 | 704/228 |
| 2002/0172350 A1 * | 11/2002 | Edwards | G10L 21/02 | 379/392.01 |
| 2003/0179888 A1 * | 9/2003 | Burnett | G10L 21/0208 | 381/71.8 |
| 2004/0013276 A1 * | 1/2004 | Ellis | G10L 21/0208 | 381/94.3 |
| 2004/0030544 A1 * | 2/2004 | Ramabadran | G10L 25/78 | 704/205 |
| 2004/0236571 A1 * | 11/2004 | Laurila | G10L 25/87 | 704/210 |
| 2007/0037536 A1 * | 2/2007 | Battaglini | H04M 1/247 | 455/212 |
| 2007/0265842 A1 * | 11/2007 | Jarvinen | G10L 25/78 | 704/214 |
| 2008/0082328 A1 * | 4/2008 | Lee | G10L 25/78 | 704/234 |
| 2008/0140405 A1 * | 6/2008 | Davidson | G10L 21/038 | 704/258 |
| 2008/0172225 A1 * | 7/2008 | Kim | G10L 25/87 | 704/233 |
| 2008/0228297 A1 * | 9/2008 | Choi | G10L 21/04 | 700/94 |
| 2009/0265169 A1 * | 10/2009 | Dyba | G10L 19/012 | 704/233 |
| 2012/0185248 A1 * | 7/2012 | Sehlstedt | G10L 19/0204 | 704/233 |
| 2015/0066498 A1 * | 3/2015 | Ma | G10L 15/28 | 704/233 |
| 2015/0120299 A1 * | 4/2015 | Thomsen | G10L 15/22 | 704/246 |
| 2015/0187364 A1 * | 7/2015 | Sehlstedt | G10L 19/0204 | 704/226 |
| 2015/0256914 A1 * | 9/2015 | Wiesbauer | H04R 3/00 | 381/174 |
| 2015/0310874 A1 * | 10/2015 | Fromel | G10L 21/0364 | 704/205 |

* cited by examiner

US 10,090,005 B2

ANALOG VOICE ACTIVITY DETECTION

CROSS-REFERENCE TO RELATED APPLICATIONS

The present application claims the benefit of U.S. Provisional Patent Application No. 62/306,167, entitled "ANALOG SOLUTION FOR VOICE ACTIVITY DETECTION" and filed on Mar. 10, 2016. The entire content of that application is incorporated herein by reference.

FIELD

Some embodiments described herein are associated with sensors. More specifically, some embodiments provide sensors for voice activity detection.

BACKGROUND

Consumers increasingly expect voice control capabilities in devices, such as mobile devices, cars, and home assistants—and the hands-free convenience provided by voice control might further be suitable for wearable devices and devices found in factories (where visual displays and/or keyboards may be too small or inaccessible). This proliferation of voice control is a catalyst for the audio sensor/hardware market, which seeks to overcome plateauing performance and eroding prices by integrating higher-value functions and thereby climb the value chain. For example, microphone companies can integrate voice control to create "smart microphones," and device companies can integrate intelligent voice control into products, substantially improving the design of voice interfaces.

While some sensor markets have successfully integrated higher-value functionality (such as gesture recognition in inertial sensors), audio applications face higher sensor bandwidths and computing loads. This can make it difficult to create smart microphones that meet the power and form factor requirements of end applications. Considering these audio challenges, it might not be appropriate to integrate the traditional signal chain of Analog-to-Digital Converter ("ADC"), Digital Signal Processor ("DSP"), and memory into a microphone, especially if these blocks must be continuously powered.

Accordingly, methods and mechanisms for accurately and efficiently providing an analog solution for voice activity detection may be desired.

SUMMARY

According to some embodiments, an analog processing portion may receive an audio signal from a microphone. The analog processing portion may then convert the audio signal into sub-band signals and estimate an energy statistic value for each sub-band signal. As will be described, more than one energy statistic value might be estimated for each sub-band signal (e.g., representing a set of energy statistic values or a vector of energy statistic values). A classification element may classify the estimated energy statistic values with analog processing such that a wakeup signal is generated when voice activity is detected. The wakeup signal may be associated with, for example, a battery-powered, always-listening audio application.

Some embodiments comprise: means for receiving an audio signal at an analog voice activity detection device; means for converting the audio signal into sub-band signals; means for estimating an energy statistic value for each sub-band signal; and means for classifying the estimated energy statistic values with analog processing followed by decision smoothing such that a wakeup signal is generated when voice activity is detected.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

DETAILED DESCRIPTION

According to embodiments of the invention, a novel approach can provide an alternative for voice/audio processing tasks which may be implemented in analog circuits.

Some embodiments may limit a number of system blocks that must be continuously powered, thus enabling the following values (but not being limited to):

- approximately an order of magnitude reduction in power consumption of the audio sensing and processing system as compared to conventional;
- programmable "wake-on-voice" capability, with algorithm support for voice detection and other "wake-on-audio" capabilities;
- reduced cost of signal chain components, comparing current competitor's ADC/DSP solution with an analog processor;
- small die size, capable of integration into existing microphone packaged parts, with no change in a microphone form factor; and
- data analysis and reduction at the sensor, enabling more efficient use of hardware and software resources further down the signal chain.

In addition to smartphones and smart watches, the industry is proliferating audio control capabilities into appliances, automobiles, toys, medical devices, etc. Additional safety considerations may compel "hands free" audio control for electronics in situations where hands cannot be easily used (such as in an automobile), in low light or visually-impaired situations, where a user might be incapacitated, etc. Voice-controlled products may employ "always-on" audio, which requires that the device always "listens" for a voice to trigger the next action. As a result, power consumption may be a key challenge to enable always-on voice control. Because up to 90% of audio information might be non-voice signals, voice detection may be an important first step in a voice control system.

Figure 1:
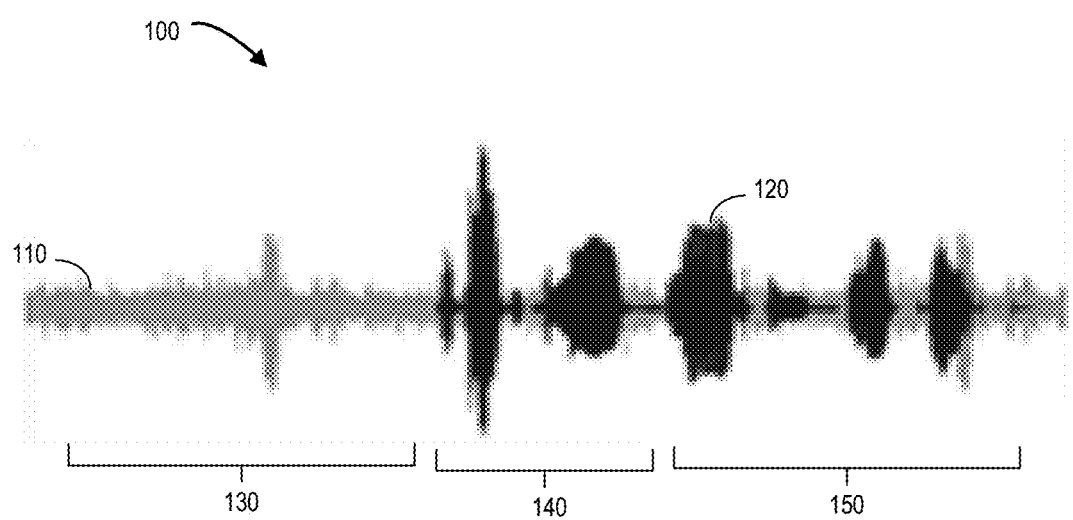
FIG. 1 is an exemplary voice control sequence.

For example, FIG. 1 illustrates an exemplary voice control sequence 100 including a non-voice signal 110 and a voice signal 120. The sequence 100 includes a voice detection portion 130 followed by a keyword 140 (e.g., "Alexa," "OK Google," "Hey Siri," etc.) which is then followed by a command 150. The sequence 100 may be used to gate the rest of the signal chain to prevent wastefully processing non-voice data.

As used herein, the phrase "voice activity detection" might be associated with a process to detect voice or speech within the audio (and might not include keyword or phrase detection). The phrase voice activity detection is sometimes also referred to as a wake-on-voice process or a wake-on-speech process. The phrase "Key Word Spotting ("KWS")" may refer to a process that detects specific spoken word or phrase. The phrase key word spotting is also sometimes referred to as a voice trigger.

Figure 2:
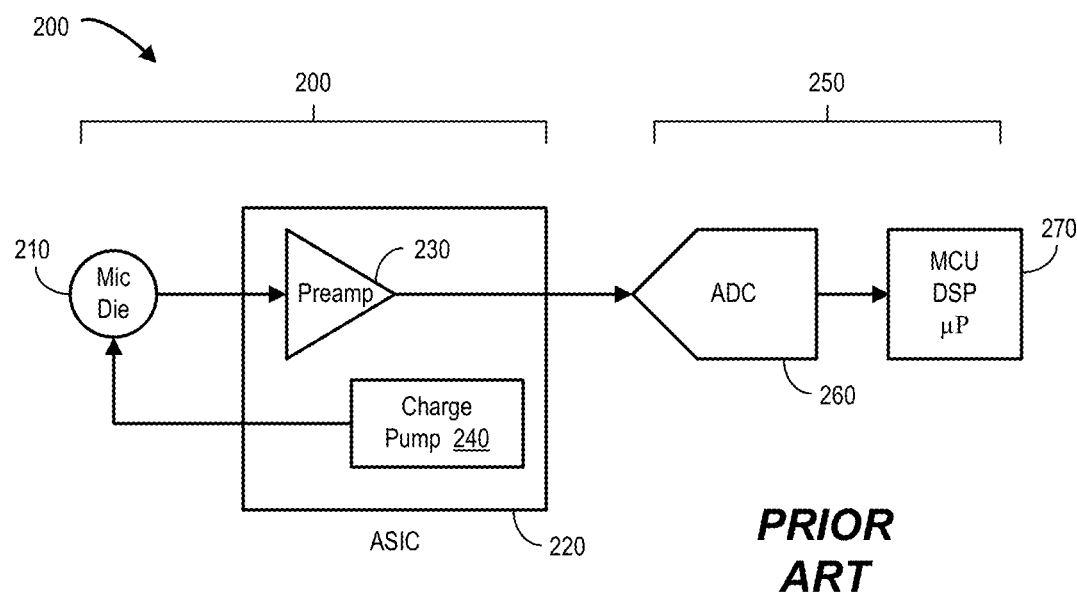
FIG. 2 illustrates an audio signal path and components in a conventional audio-based system.

FIG. 2 provides a diagram 200 of a typical audio signal path and the components that may be used to implement an audio-based system. In this example, a microphone portion 200 includes a microphone die 210 and an Application Specific Integrated Circuit ("ASIC") 220. The ASIC 220 includes a preamp 230 that receives a signal from the microphone die 210 and a charge pump 240 that biases the microphone die 210. The preamp 230 outputs a signal to an Analog-to-Digital Converter ("ADC") 260 which in turn generates a signal for a Digital Signal Processor ("DSP") 270. The ADC 260 and DSP 270 may together form an "application processor" 250. Note that the microphone 200 does no processing, and all of the voice and audio processing is instead accomplished in the digital processor. This may be extremely inefficient for always-on audio applications, because all of the audio data is digitized (via the ADC 260) and then analyzed for voice. This approach wastes power by digitizing all of the audio, even when the vast majority is non-voice and therefore of no value to the system.

Figure 3:
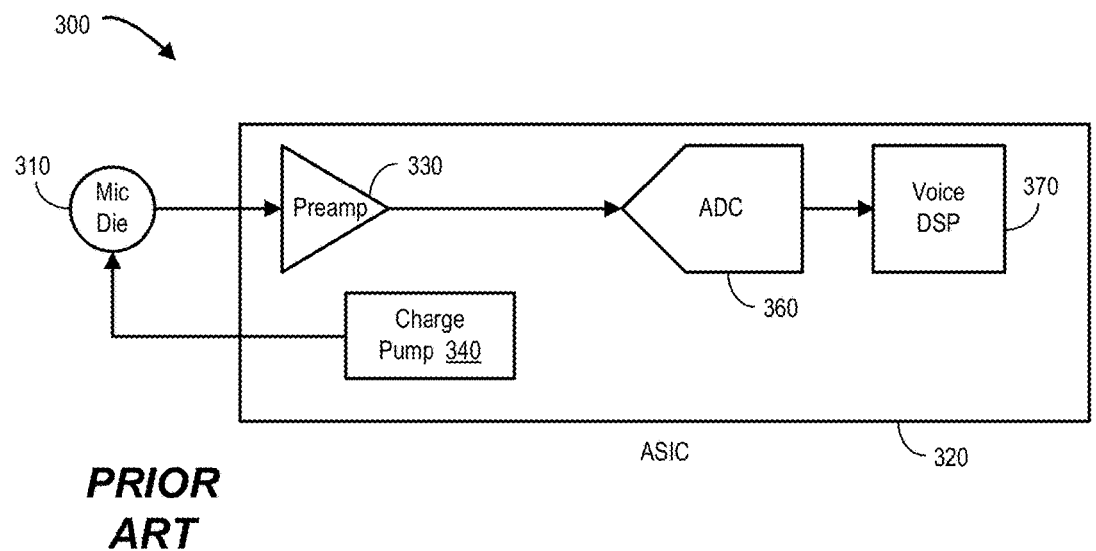
FIG. 3 illustrates a smart microphone with digital voice activity detection.

Microphone designers have been working on new audio signal-chain architectures that move voice activity detection into the microphone. However, these "smart microphones," such as the circuit 300 as seen in FIG. 3, simply move an ADC and a smaller, lower power application-specific digital processor into the packaged microphone, either as a separate die or integrated into an ASIC. As before, a microphone portion includes a microphone die 310 and an ASIC 320. The ASIC 320 includes a preamp 330 that receives a signal from the microphone die 310 and a charge pump 340 that biases the microphone die 310. The preamp 330 outputs a signal to an ADC 360 which in turn generates a signal for a voice DSP 370. Note that the ADC 360 and/or the voice DSP 370 may also be part of the ASIC 320. These additions may grow the size of the packaged microphone parts, but only provide a minimal power reduction to sustain always-on operation. This result may frustrate product developers who are attempting to create ever smaller consumer products.

Figure 4:
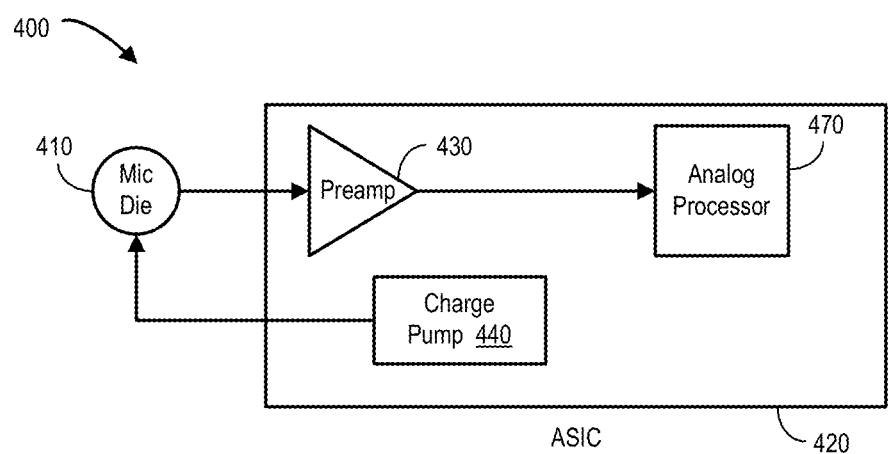
FIG. 4 illustrates a smart microphone with analog voice activity detection according to some embodiments.

An alternative analog approach, described in some embodiments presented herein, may enable the same voice detection capability, at about 1/10th of the power, with the addition of a small analog processor, as seen in FIG. 4. FIG. 4 illustrates a circuit 400 with a microphone portion that includes a microphone die 410 and an ASIC 420. The ASIC 420 includes a preamp 430 that receives a signal from the microphone die 410 and a charge pump 440 that biases the microphone die 410. The preamp 430 outputs a signal directly to an analog processor 470. Note that the analog processor 470 might also be part of the ASIC 420. Thus, some embodiments may employ innovative analog processing technology that lets data analysis tasks be moved from the digital domain to the analog domain. By analyzing and reducing the data to only the data that are desired for an end application, analog analysis may significantly reduce the activity and power consumption of the ADC and/or application to processor. In always-listening audio applications, where all of the audio data must be analyzed, the ADC may limit the lowest achievable power consumption, and, as a result, analog processing might be especially promising for audio signals.

Figure 5:
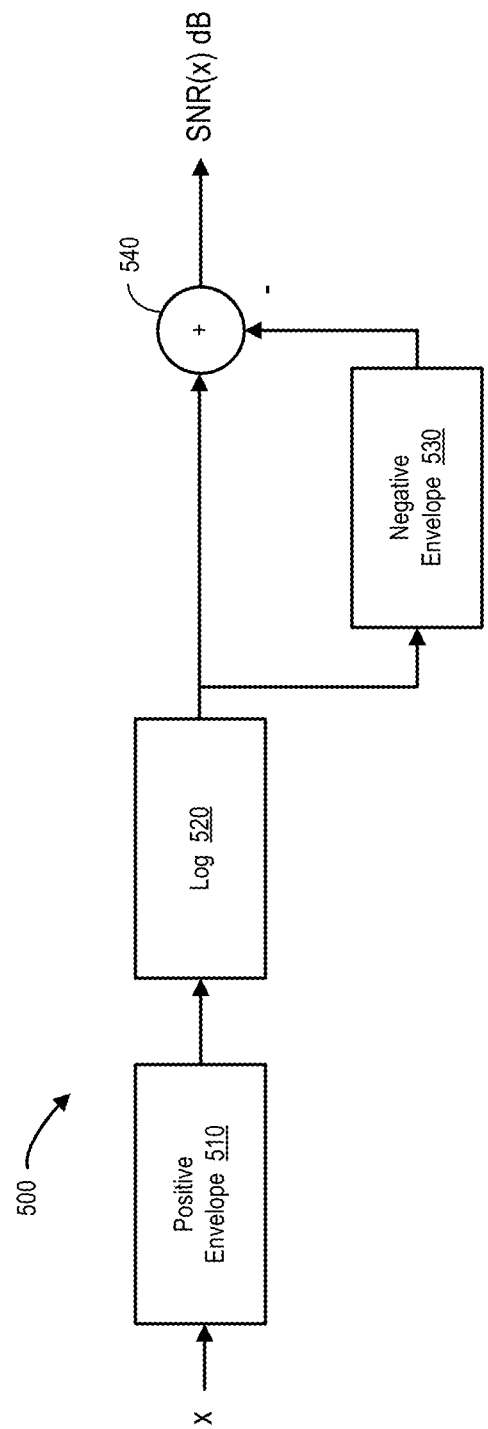
FIG. 5 illustrates a digital circuit having processing functions.

Note that analog processing architectures can perform most digital processing functions, especially those functions that are needed to analyze sensor data, and this makes analog processing a very efficient approach. For example, a typical DSP block diagram for the estimation of a signal's Signal-to-Noise Ratio ("SNR") is shown in FIG. 5. After applying a positive envelope 510 to an input signal x and extracting the log energy 520 of the signal, a negative envelope 530 is tracked to estimate the noise (i.e., the valleys between the signal contain the noise), and the noise is subtracted 540 to obtain the SNR(x) in dB. This operation may require, for example, approximately 2000 instructions per frame in a DSP.

Figure 6:
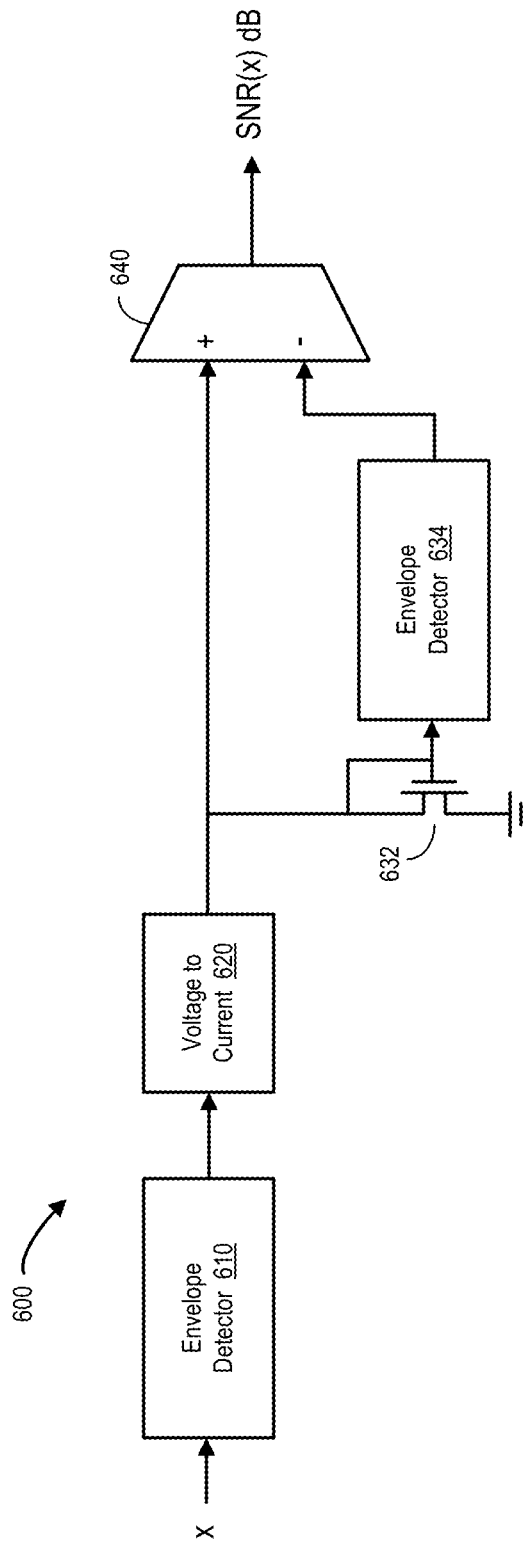
FIG. 6 illustrates an analog circuit which can be programmed to efficiently implement the digital processing functions of the circuit of FIG. 5 according to some embodiments.

FIG. 6 shows a corresponding analog implementation 600. All of the operations are efficiently mapped onto standard analog blocks, including an envelope detector 610, a voltage-to-current converter, a transistor 632, an envelope detector 624, and a mixer 640. Note that the total transistor count of the analog implementation 600 might be as low as 35, which is far less than the digital implementation 500.

Moreover, the analog solutions described herein may reduce the power needed for voice activity detection and other audio wake-up functions by up to 10 times as compared to current systems. The analog processing may preempt the use of an ADC, which dominates the system power consumption. In systems with higher-bandwidth sensors, and where all data are critical, such as audio and vibration sensors, the dominant power consumer is typically the ADC (and possibly the digital processor).

Figure 7:
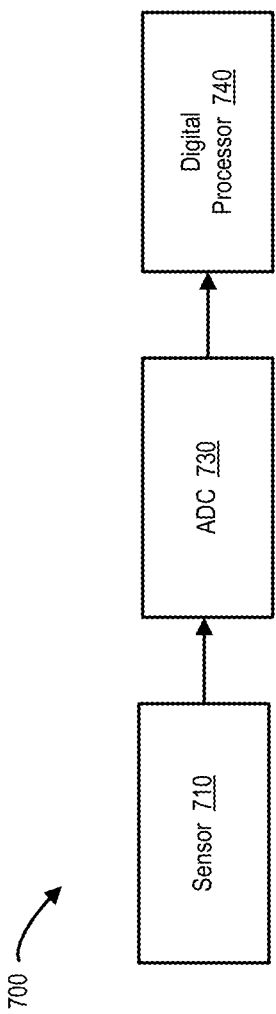
FIG. 7 is a block diagram of a voice activity detection circuit.

In a traditional digital processing system 700 such as the one shown in the FIG. 7, an ADC 730 may receive data directly from a sensor 710 and provide an output to a digital processor 740. In this system 700, power consumption is significantly dominated by the ADC 730 because all of the audio data are digitized before being analyzed. Furthermore, since ADC power consumption does not scale with the technology node nearly as aggressively as the power consumption of digital logic, the ADC 730 may dominate power consumption even more in the future.

Figure 8:
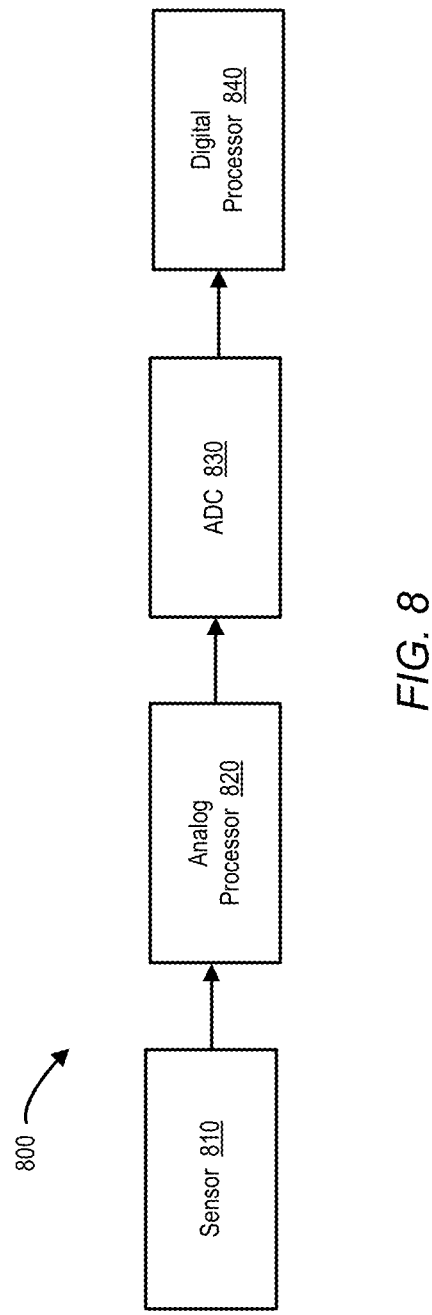
FIG. 8 is a block diagram of a voice activity detection system in accordance with some embodiments.

One way to address the power consumption in this system 700 is to reduce the ADC activity by reducing the data that are digitized. In the analog processing approach 800 illustrated in FIG. 8, an analog processor 820 may operate on the data from a sensor 810 before providing a signal to an ADC 830 (which in turn provides an output to a digital processor 840). In this way, the data can be analyzed and reduced in the analog domain so that fewer data are digitized (and the ADC 830 and the digital processor 840 may remain in sleep mode until needed). This approach 800 may better balance the power budget across the signal chain. As a result, the approach 800 may be appropriate for battery operated devices and applications where voice activation needs low power, always-on operation.

Figure 9:
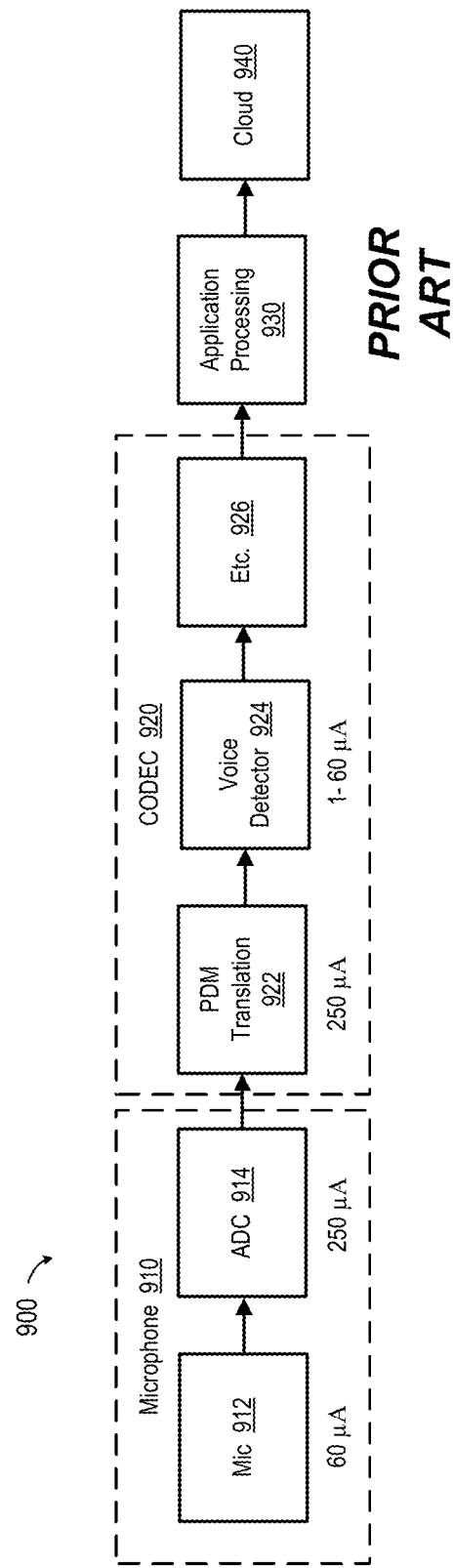
FIG. 9 illustrates a traditional signal chain for a voice controlled mobile device architecture.

FIG. 9 illustrates a traditional signal chain 900 for a voice controlled mobile device architecture. The signal chain 900 includes a microphone 910 having a microphone portion 912 that provides a signal to an ADC 914. A CODEC 920 includes a Pulse Density Modulation ("PDM") translation 922, voice detector 924, and other components 926. The CODEC 920 provides a signal to the cloud 940 via application processing 930. Note that always on supply current can amount to over 560 µA (representing the microphone portion 912, ADC 914, PDM translation 922, and voice detector 924).

Figure 10:
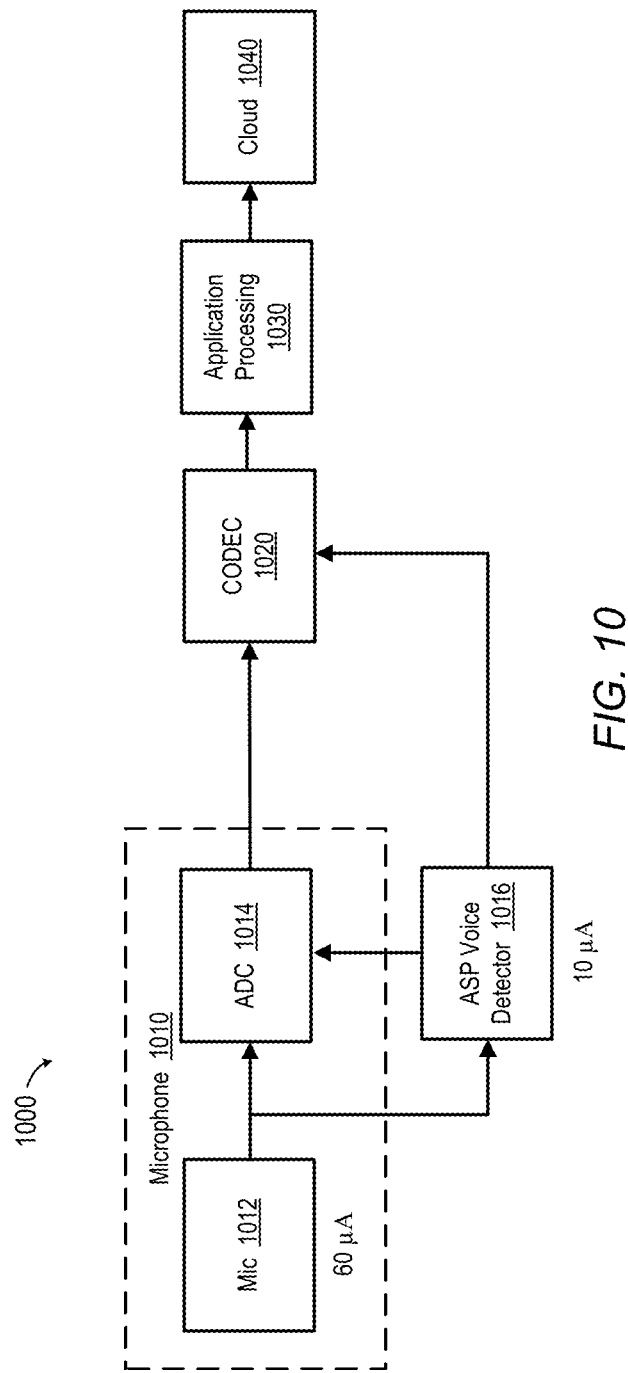
FIG. 10 illustrates a signal chain for a voice controlled mobile device architecture according to some embodiments.

FIG. 10 illustrates a signal chain 1000 for a voice controlled mobile device architecture according to some embodiments. The signal chain 1000 includes a microphone 1010 having a microphone portion 1012 that provides a signal to an ADC 1014 and an Analog Signal Processor ("ASP") voice detector 1016. A CODEC 1020 provides a signal to the cloud 1040 via application processing 1030. Note that always on supply current can amount to just 70 µA (representing the microphone portion 1012 and the ASP voice detector 1016) and integration of the ASP voice detector 1016 into the microphone 1010 ASIC might reduce the supply current even further. According to some embodiments, the ASP voice detector might be standalone, integrated into the microphone 1010, integrated into CODEC 1020, integrated into another downstream processor, etc. Note that the ASP voice detector 1016 architecture may be trained for detection of other non-voice sounds (e.g., gunshots, broken glass, automobile engines, etc.).

Figure 11:
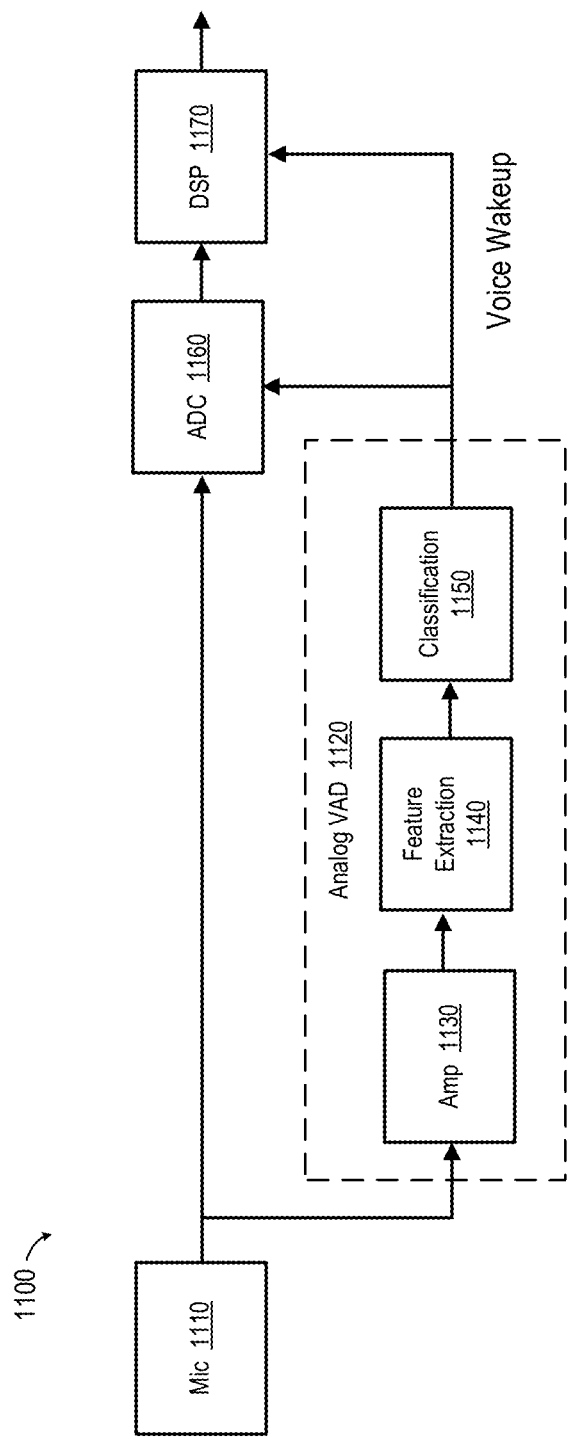
FIG. 11 is a high-level system diagram in accordance with some embodiments.

FIG. 11 is a high-level system diagram 1100 in accordance with some embodiments. A microphone 1110 provides a signal to an ADC 1160 and an analog Voice Activity Detector ("VAD") 1120. The ADC 1160 provides data to a DSP 1170, and both the ADC 1160 and DSP 1170 may receive a signal from the analog voice activity detector 1120 (e.g., a "wakeup" signal when voice data is detected). According to some embodiments, a wakeup signal may be provided to a digital processing portion of the circuit (e.g., which may include the ADC 1160). The voice activity detector 1120 may include an amplifier 1130, a feature extraction element 1140, and a classification element 1150. According to some embodiments, the analog VAD 1120 (as well as the ADC 1160 and even DSP 1170) may be integrated into the microphone 1110. The analog VAD 1120 is illustrated in FIG. 11 with a generic structure that will be described in more detail in connection with FIGS. 12 through 22.

Note that a DSP might process audio one frame at a time (from approximately 10 msec to 40 msec of audio). Moreover, feature values may be associated with an average across the duration of the frame and classification of a frame might use the features of the current frame and, in some embodiments, one or more past frames. Instead of frames, analog processors may have time constants. For example, feature values might be integrated across a time constant (and the features may have long tails into the past, which can improve accuracy compared to a frame-based approach). In addition, classification at any instant might use the features integrated over time constants of multiple durations.

It is further noted that implementation of a precise, low-overhead programmable analog system may also provide benefits with respect to the cost and size of components in sensor systems. This is because analog circuits can provide small and efficient realizations of the nonlinear operations, like scale-invariant feature extraction or statistical modeling, that might be needed in embedded sensors and perceptual processing algorithms. In contrast to digital implementations, which require large lookup tables or iterative methods to realize these operations, nonlinear analog systems can realize these operations by building them from the large-signal characteristics of a small number of circuit elements. As a result, analog solutions, such as those described herein, may enable the inclusion of voice activity detection into existing microphone packages, with no form factor changes, or into application processors. Keeping the same microphone form factor might be important to existing product developers, who would be able to avoid redesign of end products. Product developers may even be able to reduce cost since less application processor components and resources may be needed for always-on functions. These factors can provide a significant advantage over current attempts by some manufacturers to grow the microphone package size with the addition of an ADC and voice processor into the microphone package. Additionally, embodiments described herein may take advantage of mature Integrated Circuit ("IC") fabrication technologies, which are preferred for analog circuits and may be less expensive to create as compared to digital approaches.

Figure 12:
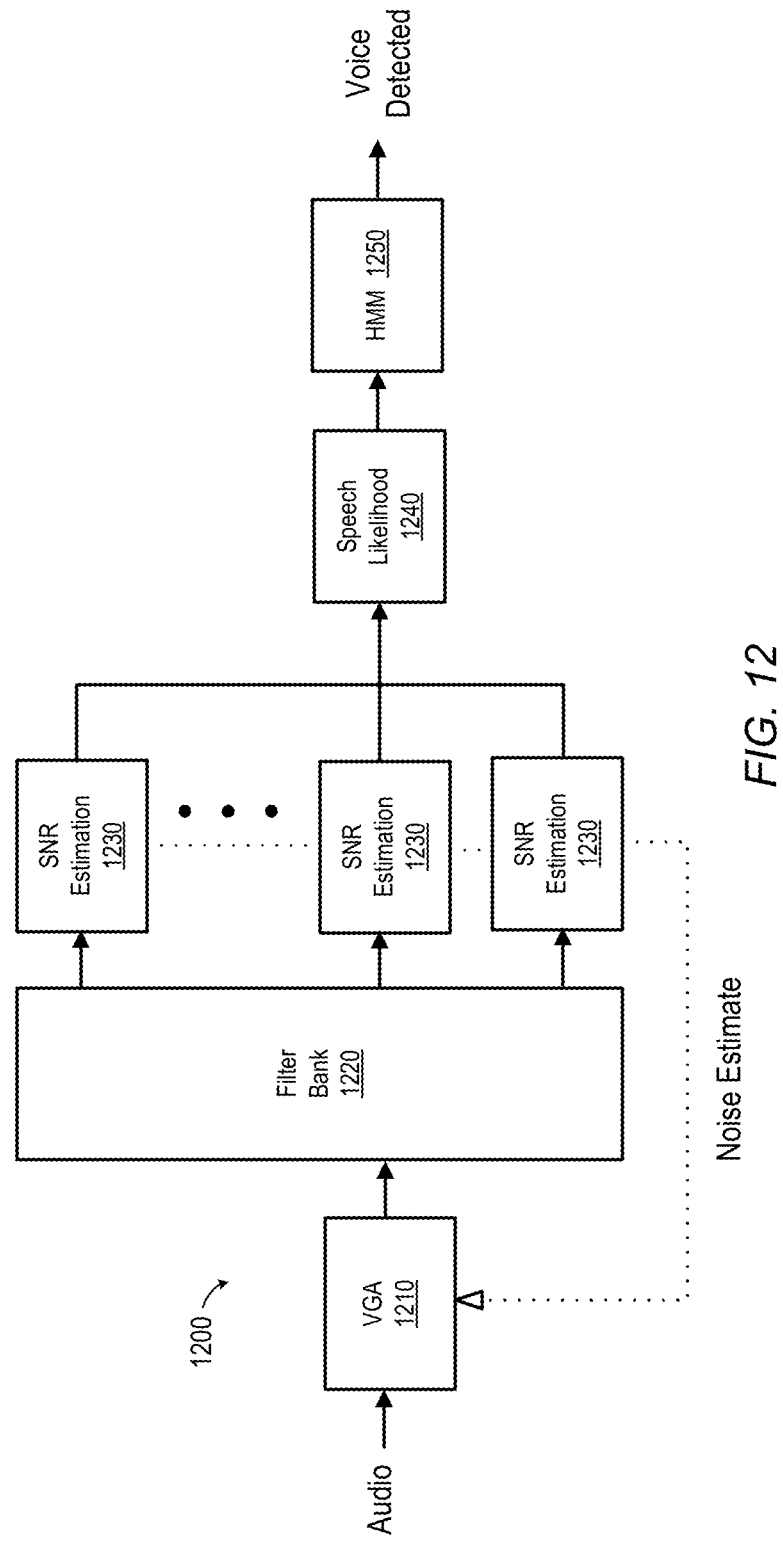
FIG. 12 is an example of an analog voice activity detection architecture according to some embodiments.

According to some embodiments, a VAD architecture 1200 is shown in a simplified form in FIG. 12. The architecture 1200 may be similar to software-based VAD algorithms. Note that VAD algorithms may use the sub-band SNR as an input feature to a small classifier, which is followed by decision smoothing (e.g., a two-state Hidden Markov Model ("HMM")). Analysis may be performed on frames of speech that are typically 20 ms in duration. A similar approach may be taken to implement the VAD, but is able to perform these operations in analog (prior to digitizing the audio data) as a result of key innovations in precise programmable analog circuits.

Audio information is received by a Variable Gain Amplifier ("VGA") which stores data in a filter bank 1220. Data from the filter bank is processed by multiple SNR estimation elements 1230 that provide outputs to a speech likelihood element 1240. Although three SNR estimation elements 1230 are illustrated in FIG. 12, note that embodiments might employ any number of such elements. The SNR estimation elements 1230 may also provide a noise estimation to the VGA 1210. The output from the speech likelihood element 1240 is processed via an HMM 1250 to generate a "Voice Detected" signal.

Figure 13:
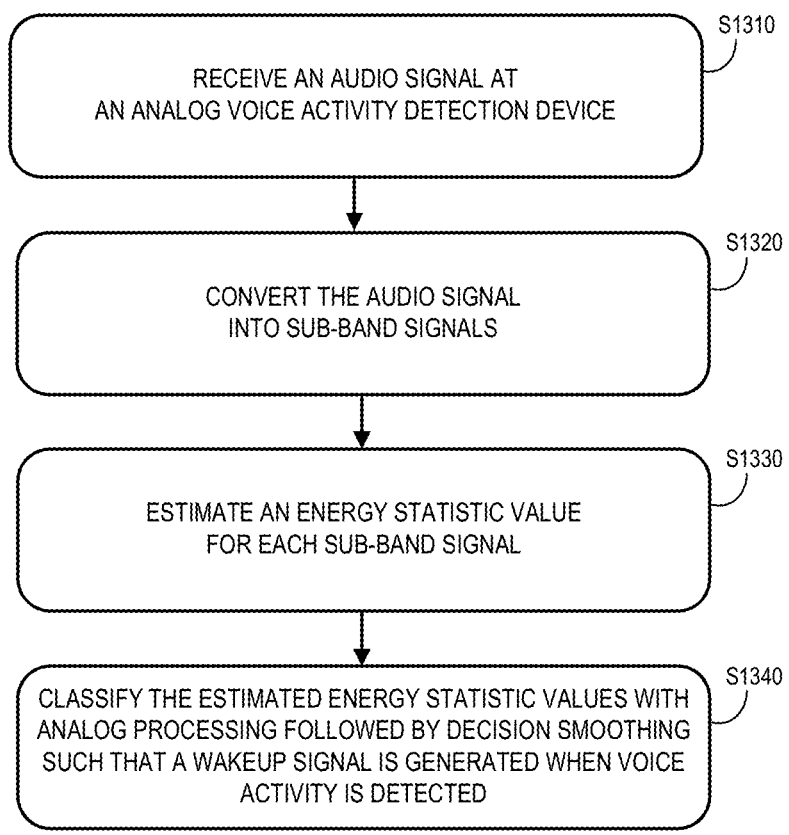
FIG. 13 is a method of analog voice activity detection according to some embodiments.

FIG. 13 is a method of analog voice activity detection according to some embodiments. At S1310, a voice activity detection device may receive an audio signal. At S1320, the audio signal may be converted into sub-band signals. At S1330, an energy statistic value may be estimated for each sub-band signal. The estimated energy statistic value might be associated with, for example, a SNR value. At S1340, the estimated energy statistic values may be classified with analog processing followed by decision smoothing (e.g., using a two-state HMM) such that a wakeup signal is generated when voice activity is detected. The voice activity detection may be provided, according to some embodiments, for an always-listening audio application. According to some embodiments, the wakeup signal might be provided to an audio processor which detects a key phrase in the audio signal and, as a result, wakes up an application processor. Note that the wakeup signal could be provided to a beamforming microphone array and digital processor to initiate high-performance audio capture for voice control. Moreover, in some embodiments the wakeup signal is used to gate the audio signal before it is passed to a subsequent processor.

Figure 14:
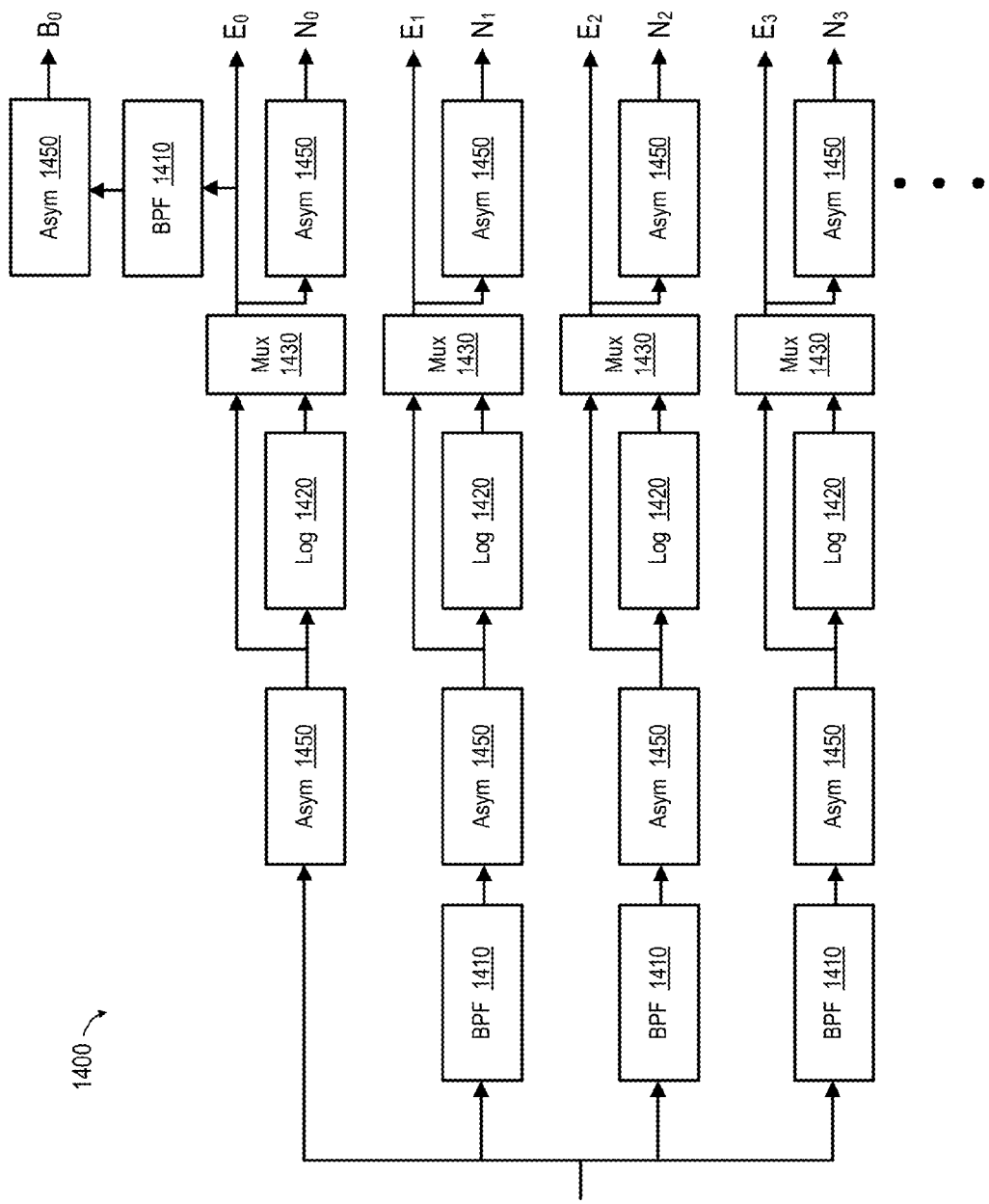
FIG. 14 illustrates a feature extraction architecture in accordance with some embodiments.

FIG. 14 illustrates a feature extraction architecture 1400 in accordance with some embodiments. The feature extraction architecture 1400 might be associated with, for example, the feature extraction element 1140 of FIG. 11. The architecture 1400 provides Energy values ($E_N$) and Noise values ($N_N$) for multiple channels N along with a bandpass value ($B_0$). For each channel, a bandpass filter 1410 may receive the audio signal and provide an output to an asymmetric integrator ("Asym") 1450 described in more detail with respect to FIG. 15. A mux 1430 receives an output from the Asym 1450 along with a log output 1420. The output of the mux 1430 represents $E_N$ and, after passing through another Asym 1450, $N_N$. Note that the bottom three channels are used for multi-band SNR estimation while the top channel is used to identify transient noises. According to some embodiments, machine learning may be used to train the feature extraction architecture 1400 to obtain better (but less intuitive) features. Although a particular number of energy and noise estimated values are illustrated in FIG. 14, note that embodiments might employ any number of such values. Moreover, for each sub-band more than two estimated values might be generated as described with respect to FIG. 16B.

Figure 15:
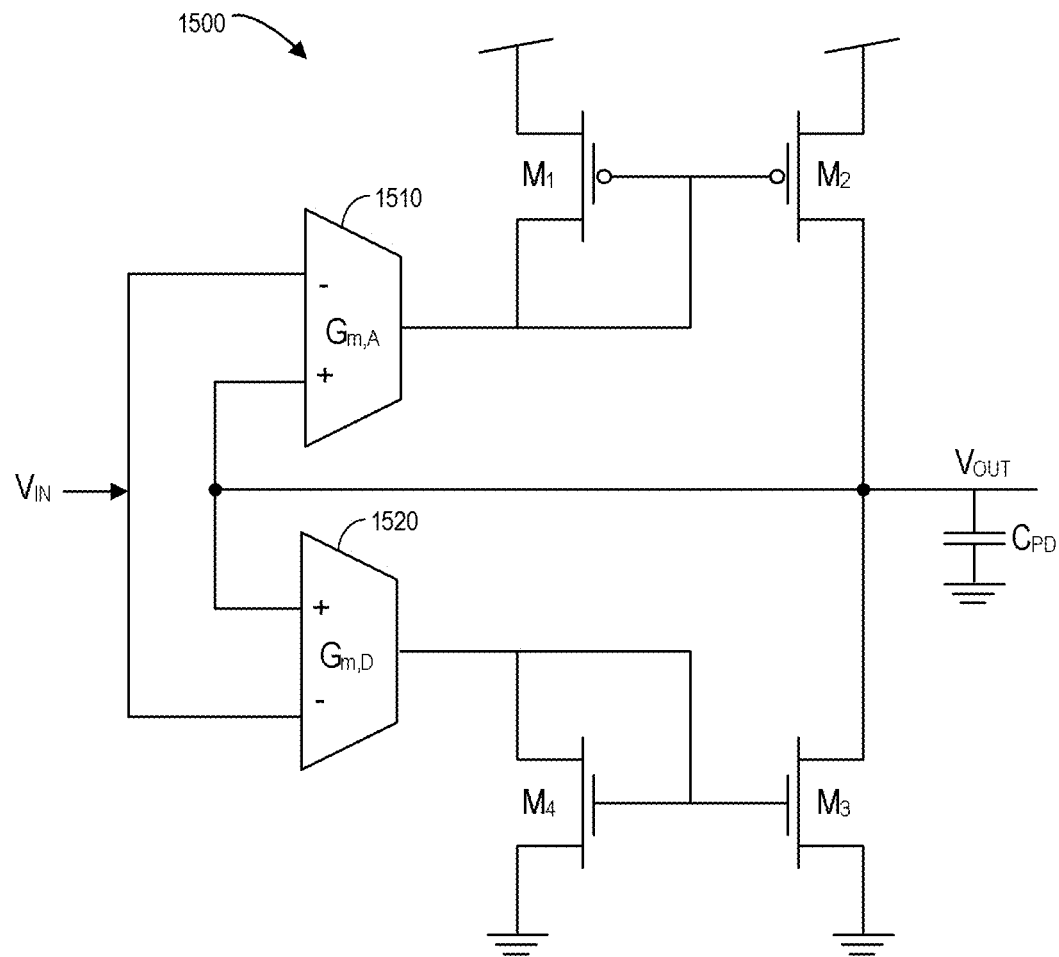
FIG. 15 is an asymmetric integrator for feature extraction in accordance with some embodiments.

FIG. 15 is an asymmetric integrator 1500 for feature extraction in accordance with some embodiments. A first transconductor $G_{m,A}$ 1510 and a second transconductor $G_{m,D}$ 1520 receive $V_{IN}$ and $V_{OUT}$ as input signals. The circuit 1500 further includes four transistors $M_1$ through $M_4$ and a capacitor $C_{PD}$ between $V_{OUT}$ and ground. The integrator 1500 may, according to some embodiments, be used to perform different types of magnitude estimation. Note that the top/bottom paths charge/discharge the capacitor $C_{PD}$ at different, tunable rates: a charge rate, called "A" for attack; and a discharge rate, call "D" for decay. By modifying A and D, many different features may be extracted from the signal using the same circuit 1500. For example, changing the ratio of A over D may allow for different magnitude estimates (positive, negative, envelope, RMS, etc.). As another example, scaling A and D together may allow for the integration of the magnitude estimate over different time constants. Note that embodiments may use other circuits for asymmetric integration. For example, embodiments might cascade additional integration stages to reject estimation ripple, or might substitute other, less tunable, circuits for magnitude estimation.

Figure 16A:
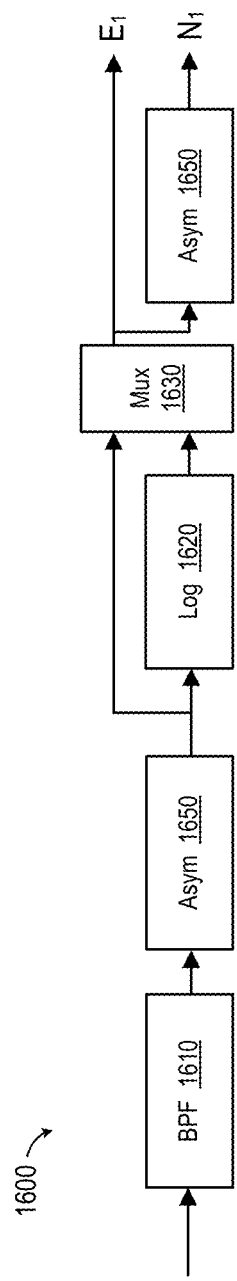
FIG. 16A illustrates sub-band Signal-to-Noise Ratio ("SNR") estimation for feature extraction according to some embodiments.

FIG. 16A illustrates sub-band SNR estimation 1600 for feature extraction according to some embodiments (e.g., in connection with one of the channels of FIG. 14). The circuit 1600 includes a bandpass filter 1610 that receives an audio signal and provides an output to an Asym 1650. A mux 1630 receives an output from the Asym 1650 along with a log output 1620. The output of the mux 1630 represents $E_1$ and, after passing through another Asym 1650, $N_1$. Note that the BPF 1610 may extract a sub-band of audio. The first Asym 1650 may perform an RMS-type estimation to get a typical energy estimate. Note that the log 1620 may be optional (and may facilitate determining a true SNR). The second Asym 1650 may perform slow envelope detection on the minimum of the signal (a common DSP technique to obtain a noise estimate of a signal). The output $E_1$ is the energy of the sub-band and $N_1$ is the noise. If the log 1620 is used, then $E_1$-$N_1$ is the log of the SNR, thus providing an SNR estimator. Note that embodiments may be motivated by digital VADs that often focus on the sub-band SNR as a feature vector. Moreover, the noise $N_1$ estimate allows the system to adapt to changing background noise. Although three SNR bands are illustrated (as a tradeoff between size and performance) any other number of bands or channels might be used instead.

Figure 16B:
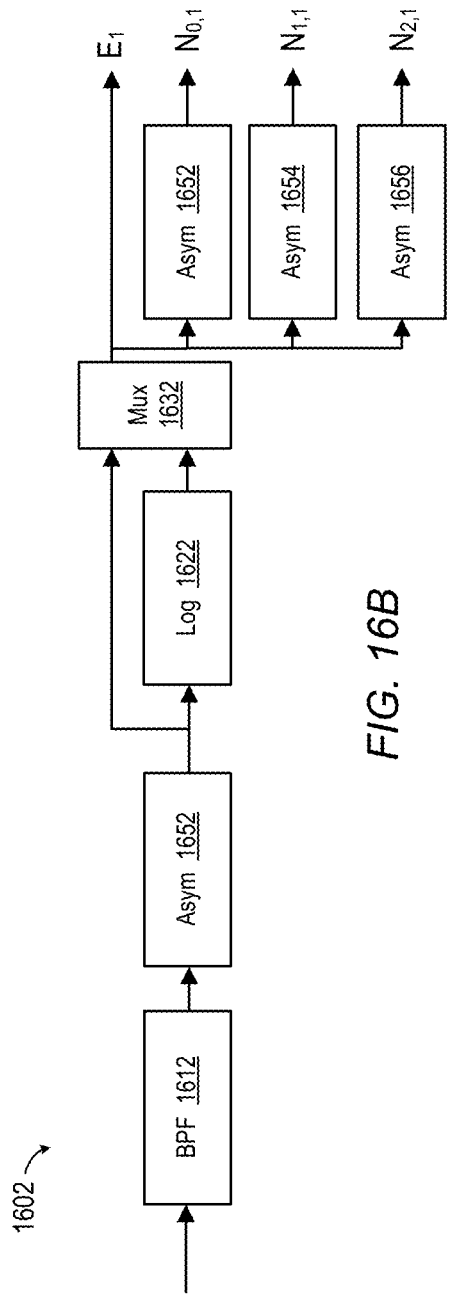
FIG. 16B illustrates sub-band energy statistic value estimations for feature extraction according to another embodiment.

FIG. 16B illustrates sub-band energy statistic value estimations 1602 for feature extraction according to another embodiment (e.g., in connection with one of the channels of FIG. 14). As before, the circuit 1602 includes a bandpass filter 1612 that receives an audio signal and provides an output to an Asym 1652. A mux 1632 receives an output from the Asym 1652 along with a log output 1622. The output of the mux 1632 represents E1 and, after passing through another Asym 1652, $N_{0,1}$. According to this embodiment, the output of the mux 1632 also passes through Asym 1654 to create $N_{1,1}$ and Asym 1656 to create $N_{2,1}$. Although three Asyms 1652, 1654, 1656 are illustrated as being attached to the mux 1632 in FIG. 16B, note that other numbers of Asyms may be attached instead. The resulting N*,1 values form a vector of energy statistics to improve classification accuracy. One case for energy statistic estimation is the long-term minimum, which represents noise for SNR estimation. Additional Asyms may allow more statistics to be extracted, because each Asym may be biased to sample a different point on the signal's energy distribution. For example, a second Asym may be biased to extract the standard deviation of the background noise, which may be combined with the SNR estimate to better adapt to different noise environments. More generally, a larger number of Asyms may sample the histogram of the signal's energy and then the classifier may trigger based on the shape of the histogram.

Figure 17:
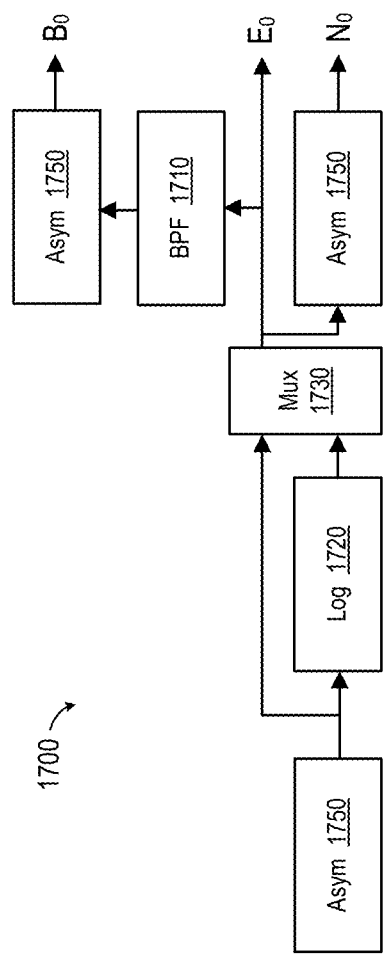
FIG. 17 illustrates transient noise features for feature extraction in accordance with some embodiments.

FIG. 17 illustrates transient noise features 1700 for feature extraction in accordance with some embodiments (e.g., in connection with the top path of FIG. 14). The circuit 1700 includes an Asym 1750 that receives an audio signal. A mux 1730 receives an output from the Asym 1750 along with a log output 1720. The output of the mux 1730 represents $E_0$ and, after passing through another Asym 1750, $N_0$. $E_0$ is provided to another Asym 1750 via a BPF to generate an overall bandpass value $B_0$ of the envelope modulation. Note that these noise features may be calculated on the wide-band audio (so no initial BPF is shown) although a wide-band BPF may be needed if the amplifier does not bandlimit the signal. The first Asym 1750 is again used to extract an RMS-type estimate (essentially the wide-band energy). The log 1720 is again optional (but it may help if gain control is not used in the amplifier). According to some embodiments, the BPF 1710 may be set to pass 10 Hz to 80 Hz. These frequencies may indicate "choppy" noise (like wind noise or zipper sounds). The top-right Asym 1750 may extract the envelope to have a persistent value throughout the noise. The lower-right Asym 1750 may have an attack rate that matches typical syllable rise times. As a result, if $N_O$ lags behind $E_O$ during rise, that indicates a transient that is too fast to be speech. The lower-right Asym 1750 may also have a decay rate that matches typical syllable fall times. As a result, if $N_O$ lags behind $E_O$ during fall, that may also indicate a transient sound.

When the system is woken up as a result of the presence of voice data, it may be beneficial to provide the digital system with information about the signal preceding the wakeup trigger (i.e., "lookback" information). Certain methods to provide lookback information are noted. First, the feature extraction circuit 1400 of FIG. 14 can provide the extracted information, such as the noise estimates prior to the start of speech and/or the spectrum of the audio at the time of the trigger. This information may be used by a subsequent DSP algorithm to improve processing results. According to some embodiments, the feature extraction architecture may be expanded to extract histograms of signals, which might simplify training to detect different types of sounds and provide more lookback information to a subsequent DSP algorithm for further improvements in processing results. A second method to provide lookback information is to use a fast detector, such as a threshold detector or an acoustic activity detector, to trigger an ADC and digital buffer at the start of any sound, but only forward the buffered data once and if the VAD device indicates the presence of speech. In this way, the raw data at the start of speech is available, while the overall system power consumption may still be reduced by preventing the ADC from performing always-on conversion and preventing the digital system from processing every sound. It is noted that in some embodiments an analog buffer may be used in place of an ADC and digital buffer. A third method to provide lookback information to a subsequent DSP is to periodically sample a short segment of speech, for example to sample and store 50 msec of speech every second. Then, when the DSP is awoken by the VAD system, the DSP may use this short sample as an indicator of the background noise environment.

Figure 18:
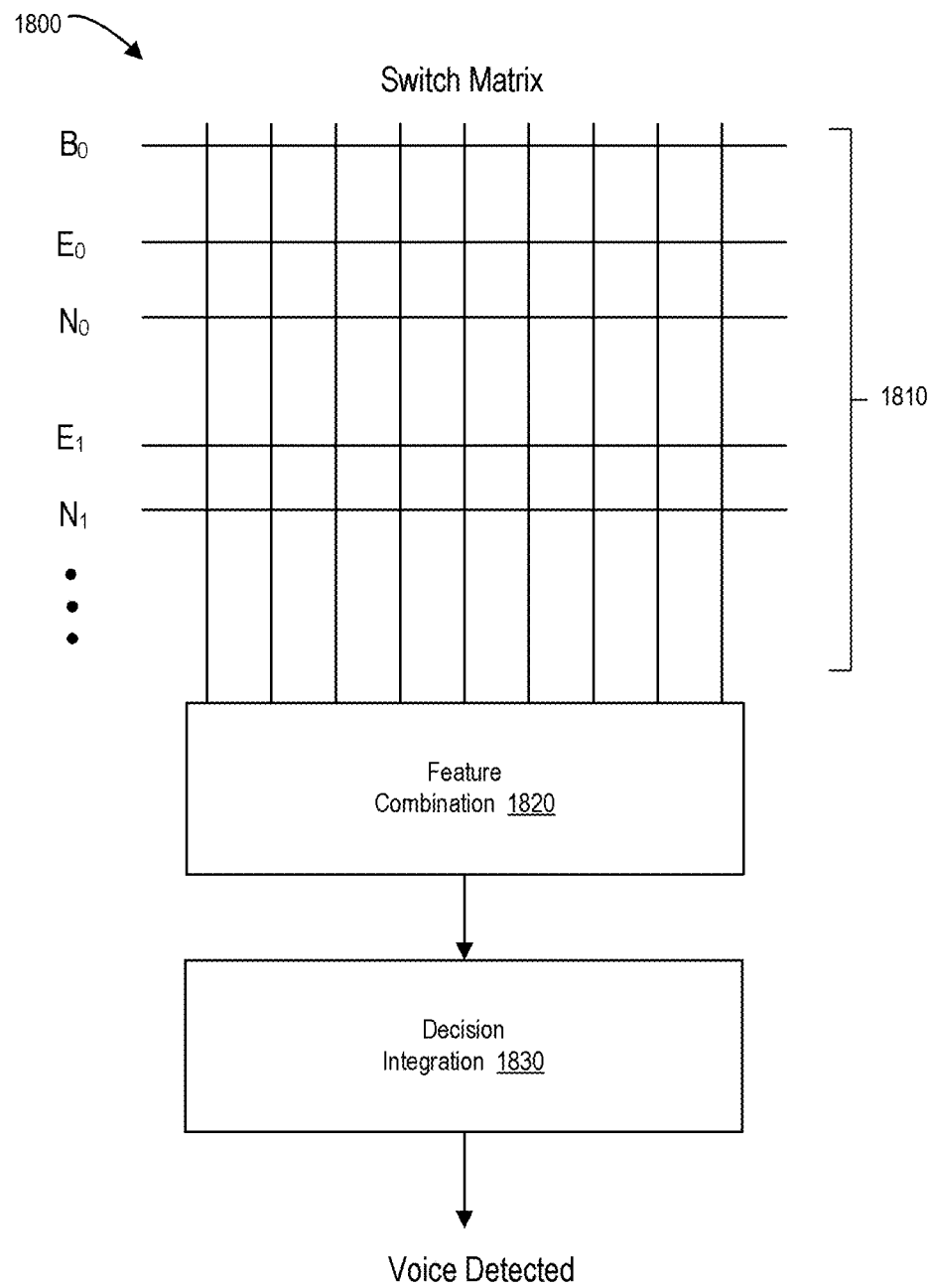
FIG. 18 is an example of a classification circuit according to some embodiments.

FIG. 18 is an example of a classification circuit 1800 according to some embodiments. The classification circuit 1800 might be associated with, for example, the classification element 1150 of FIG. 11. A switch matrix 1810 receives features as inputs (e.g., $B_0$, $E_0$, $N_0$, $B_1$, $N_1$, etc.). A feature combination element 1820 may then provide a signal to a decision integration element 1830 that generates a "Voice Detected" output. Note that the switch matrix 1810 may be optional (and may be included at the input to allow the feature vector to be wired into the feature combination circuitry 1820 in different ways based on offline training). The feature combination circuitry 1820 may, according to some embodiments, scale the difference between pairs of features and adds them together. Note that the decision integration circuitry 1830 may assert a trigger after it has reached a sufficient confidence that voice is in fact present.

Figure 19:
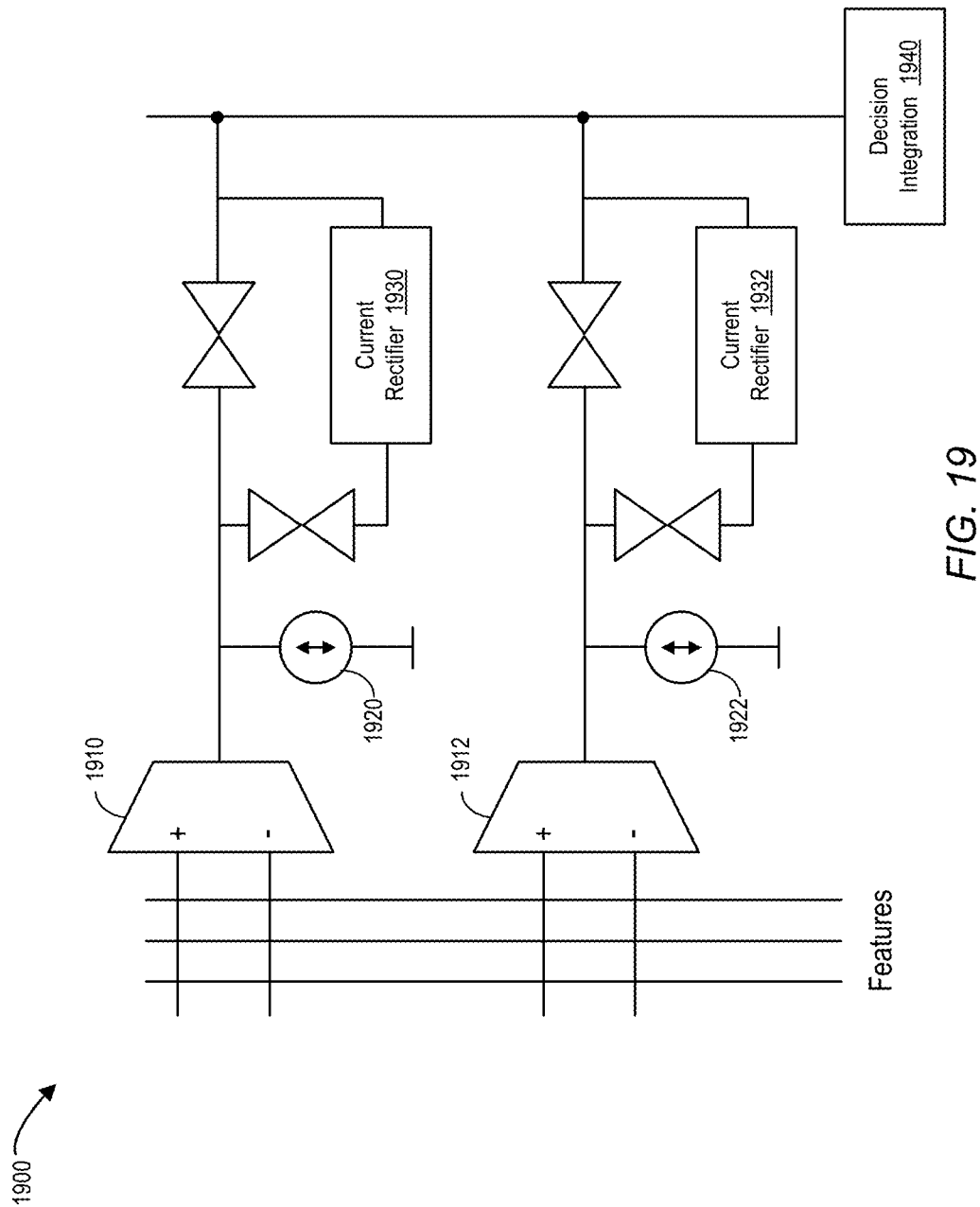
FIG. 19 illustrates a first feature combination example for classification in to accordance with some embodiments.

FIG. 19 illustrates a first feature combination example 1900 for classification in accordance with some embodiments. The example 1900 might be associated with, in some cases, the feature combination element 1820 of FIG. 18. The example 1900 includes two feature scaling channels. The first channel includes a Operational Transconductance Amplifier ("OTA") 1910, a current source/sink 1920, and a current rectifier 1930. The second channel also includes an OTA 1912, a current source/sink 1922, and a current rectifier 1932. Output of the two channels is then provided to a decision integration element 1940. Note that an OTA may scale the difference between a pair of features, the current source/sink may add an offset, and the current rectifier may provide an optional half-wave rectification. For sub-band SNR, the OTAs subtract $N_1$ from $E_1$ (which is the SNR of the band) and pass the current without offset or rectification to sum with the SNR currents of other bands. For a noise feature, such as onset of a transient, the OTA may subtract $N_0$ from $E_0$, which indicates how much faster the noise rises than typical speech, the current source may subtract an offset current (since a small difference likely isn't caused by a noise), then half-wave rectification may be applied since onset transients are only described by positive values. Note that the scale factors (OTA transconductance) and offsets (current source values) may be learned offline with optimization/machine learning. Moreover, these values may be programmable and/or re-programmable in the architecture according to some embodiments.

Figure 20:
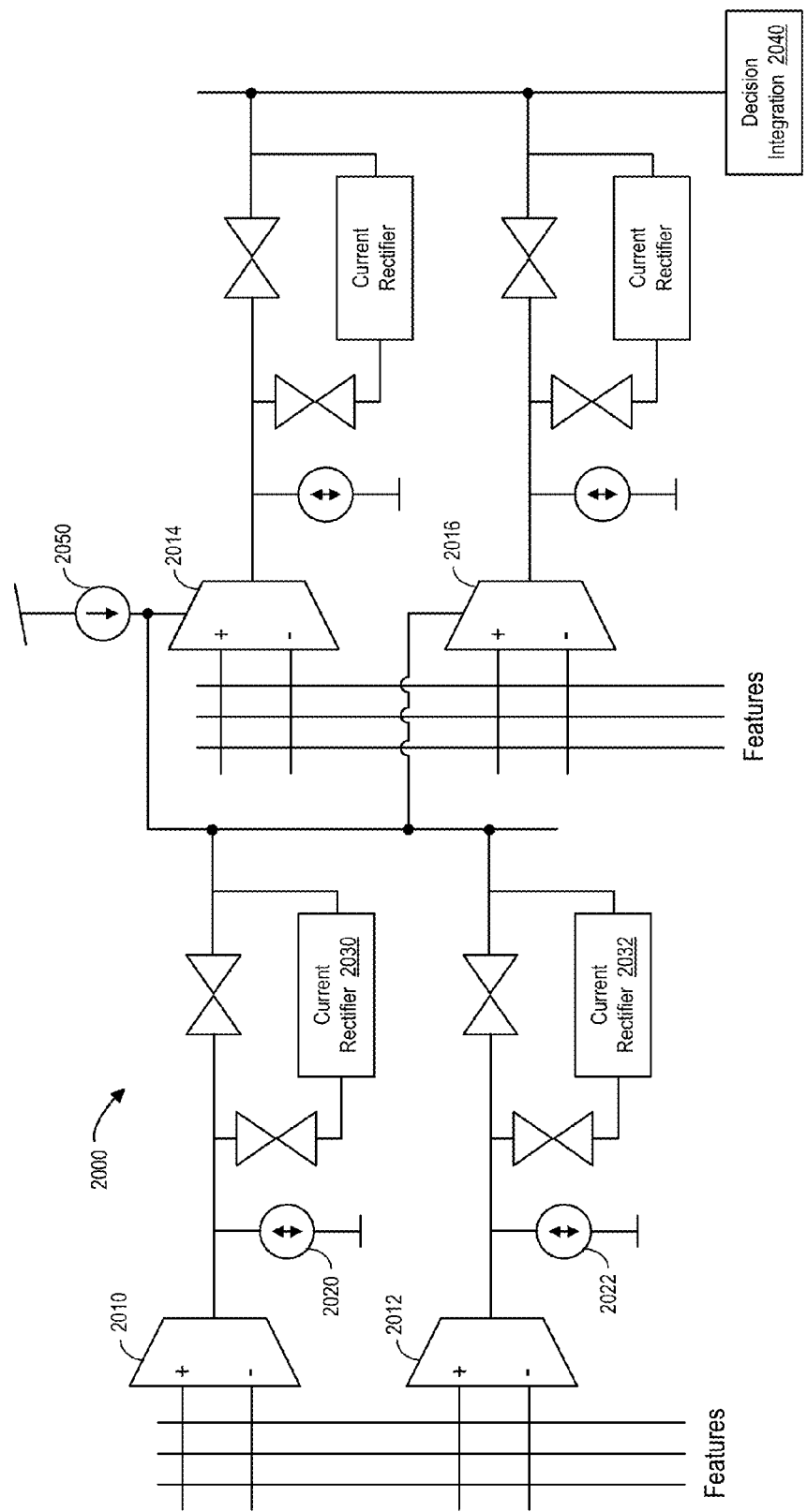
FIG. 20 illustrates a second feature combination example for classification according to some embodiments.

FIG. 20 illustrates a second feature combination example 2000 for classification according to some embodiments. The example 2000 might be associated with, in some cases, the feature combination element 1820 of FIG. 18. As before, the example 2000 initially includes two feature scaling channels. The first channel includes an OTA 2010, a current source/sink, and a current rectifier. The second channel also includes an OTA 2012, a current source/sink, and a current rectifier. Output of these two channels is then provided to another two channels (having OTAs 2014, 2016) associated with a current source/sink 2050. Output of these two channels is then provided to a decision integration element 2040. In this variation, one set of circuits (on the left) is used to combine features that are then divided from the combined features on the right by dynamically changing the OTA biases.

Figure 21:
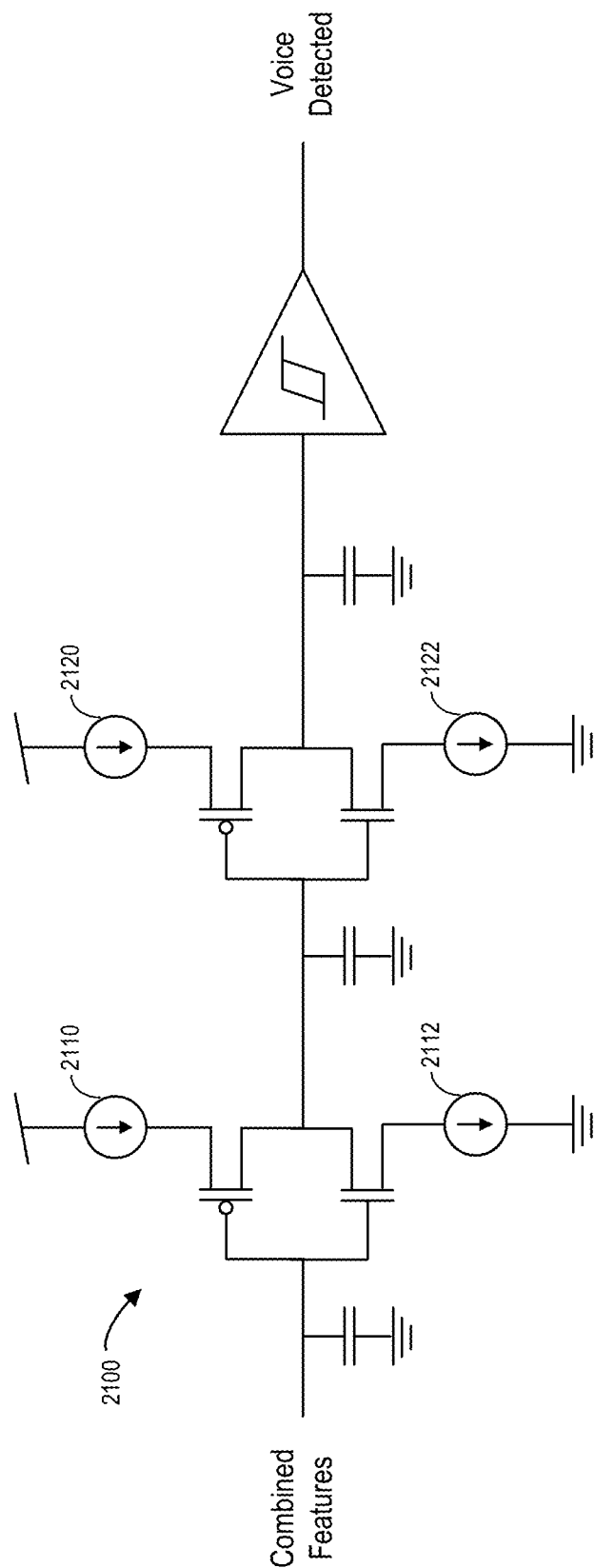
FIG. 21 illustrates a first decision integration example for classification in accordance with some embodiments.

FIG. 21 illustrates a first decision integration example 2100 for classification in accordance with some embodiments. The example 2100 might be associated with, in some cases, the decision integration element 1830 of FIG. 18. The example 2100 receives combined features and includes current source/sinks 2110, 2112, 2120, 2122 that output a "Voice Detected" signal. Note that the "combined features" signal is a current, so it may integrate on the first capacitor. A larger current may indicate a greater likelihood of voice. When the voltage on the capacitor rises to the trigger point of the first inverter, the circuit 2100 is very confident that voice is present. The cascade of inverters with current starving provides a simple "hangover" method to connect speech/noise segments separated by short gaps of noise/speech. By making the current starving asymmetric, the inverters may reject pulses shorter than a certain length.

Figure 22:
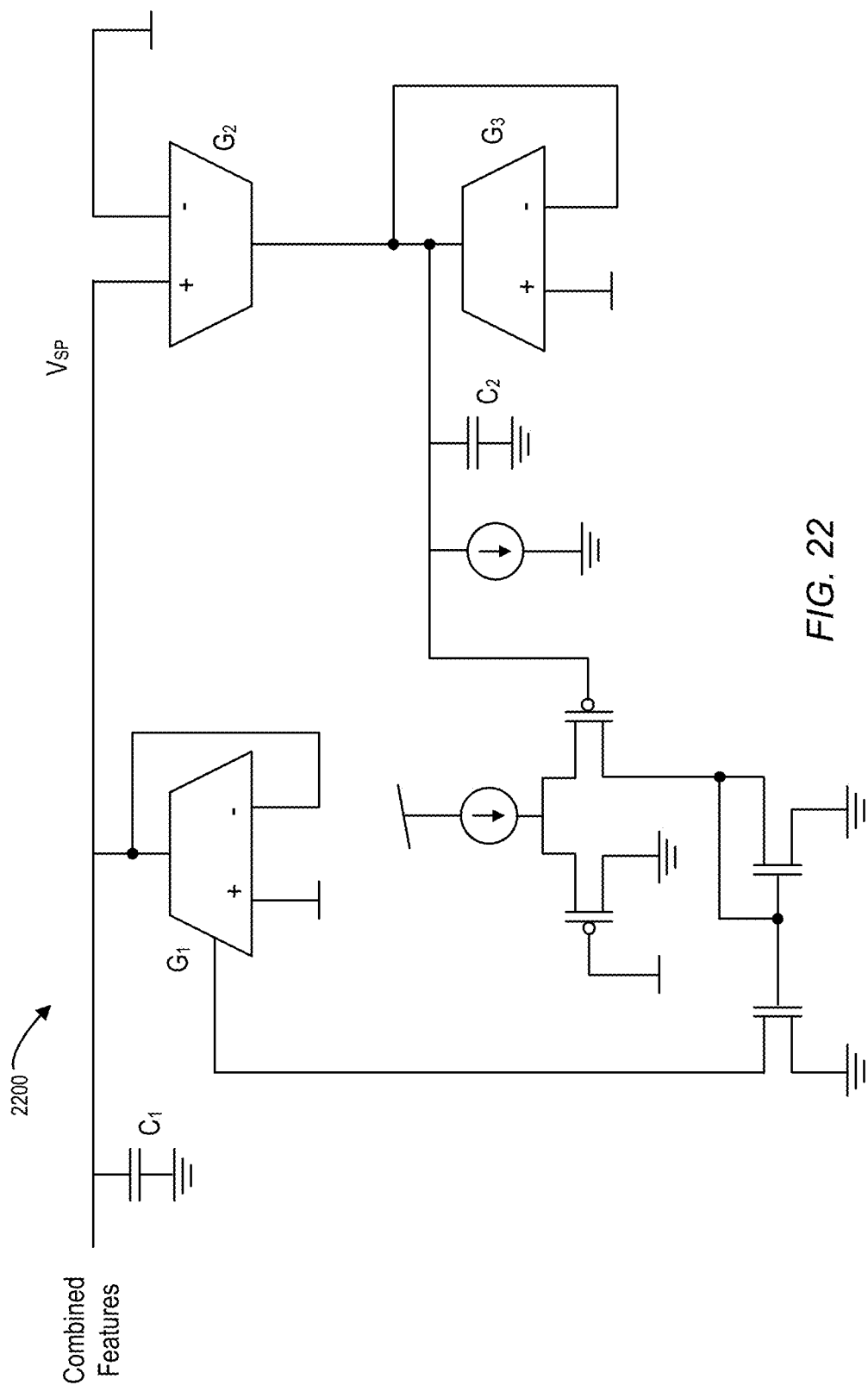
FIG. 22 illustrates a second decision integration example for classification according to some embodiments.

FIG. 22 illustrates a second decision integration example 2200 for classification according to some embodiments. The example 2200 might be associated with, in some cases, the decision integration element 1830 of FIG. 18. The circuit 2200 includes OTAs $G_1$ through $G_3$ and capacitors $C_1$ and $C_2$ and represents an alternative form of decision integration. Note that the "combined features" current integrates on $C_1$ and is terminated on $G_1$ to create a voltage $V_{SP}$ which represents the final likelihood of speech. $V_{SP}$ is attenuated by the bias of which is adapted using the positive feedback loop. In addition, $G_2$, $G_3$, $C_2$ form an amplifying lowpass filter (providing a delayed version of $V_{SP}$). This delayed version is shifted by the current sink, then the differential pair outputs a sigmoidal current (since $V_{SP}$ is amplified) to bias $G_1$. When $V_{SP}$ is recently small, $G_1$ receives a large bias, which reduces the effect of "combined features." In other words, if the integrated probability of speech was recently low, then need a very high likelihood of speech from classifier to increase $V_{SP}$.

According to some embodiments, other features, such as zero-crossing-rate, cepstrum, histograms, etc. may be added to the feature extraction architecture The analog technology described herein can significantly improve various voice applications, where analog processing can reduce data and power by detecting the presence of voice and then waking up the rest of the signal chain to respond to this desired information. Additional audio applications can benefit as well, where analog processing can be used to extract audio features (e.g., short-term SNR in a frequency band or long-term audio features like background noise statistics) for subsequent digital processing or provide additional "wake-on-audio" for applications such as security (broken glass), surveillance (auto/truck signatures), etc. In addition to reducing power, performing data analytics early in the signal chain (in the analog domain) has the potential to reduce the cost of the system and simplify the design of the end product.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

It is to be understood that the foregoing description is intended to illustrate and not to limit the scope of the invention, which is defined by the scope of the appended claims. Other embodiments are within the scope of the following claims. It is also noted that various non-limiting embodiments described and claimed herein may be used separately, combined or selectively combined for specific applications.

What is claimed is:

1. A voice activity detection device, comprising:
   an analog processing portion to receive an audio signal from a microphone, convert the audio signal into sub-band signals, and estimate an energy statistic value for each sub-band signal, including:
   for each sub-band signal, a bandpass filter and one or more asymmetric integrators to output an energy value and a noise value for that sub-band signal; and
   a classification element to classify the estimated energy statistic values with analog processing such that a wakeup signal is generated when voice activity is detected.

2. The device of claim 1, wherein the estimated energy statistic value is a Signal-to-Noise Ratio ("SNR") value.

3. The device of claim 1, wherein the analog processing portion and classification element are integrated into the microphone.

4. The device of claim 1, wherein the energy values and noise values are associated with feature extraction.

5. The device of claim 4, wherein the feature extraction is further associated with transient noise features.

6. The device of claim 4, wherein extracted features are output when the wakeup signal is generated.

7. The device of claim 4, wherein extracted features are provided to a feature combination element.

8. The device of claim 7, wherein the extracted features are provided to the feature combination element via a programmable switch matrix.

9. The device of claim 7, wherein the feature combination element provides data to a decision integration element that generates the wakeup signal.

* * * * *